US012679518B2

(12) United States Patent
Holopainen et al.

(10) Patent No.: US 12,679,518 B2
(45) Date of Patent: Jul. 14, 2026

(54) WIRELESS SUBMERSIBLE GAUGE HAVING UNDERWATER COMMUNICATION INTERFACE FOR SMART DEVICES

(71) Applicants: Reima K. Holopainen, Zufikon (CH);
Niklas Stoss, Waal (DE)

(72) Inventors: Reima K. Holopainen, Zufikon (CH);
Niklas Stoss, Waal (DE)

(73) Assignee: Johnson Outdoors Inc., Racine, WI
(US)

( * ) Notice: Subject to any disclaimer, the term of this
patent is extended or adjusted under 35
U.S.C. 154(b) by 90 days.

(21) Appl. No.: 18/585,605

(22) Filed: Feb. 23, 2024

(65) Prior Publication Data

US 2024/0367766 A1       Nov. 7, 2024

Related U.S. Application Data

(60) Provisional application No. 63/449,653, filed on Mar.
3, 2023.

(51) Int. Cl.
*B63C 11/02*       (2006.01)
*H04B 11/00*       (2006.01)
(52) U.S. Cl.
CPC .............. *B63C 11/02* (2013.01); *H04B 11/00*
(2013.01); *B63C 2011/021* (2013.01)
(58) Field of Classification Search
CPC .... B63C 11/02; B63C 2011/021; H04B 11/00
(Continued)

(56) References Cited

U.S. PATENT DOCUMENTS 4,882,678 A * 11/1989 Hollis ..................... B63C 11/32
128/201.27
4,939,647 A * 7/1990 Clough ................... B63C 11/24
128/204.22
(Continued)

FOREIGN PATENT DOCUMENTS

CN       106054585 A       10/2016
CN       112188583 A  *  1/2021    ............. H04B 13/02
(Continued)

OTHER PUBLICATIONS https://www.amazon.com/Cressi-Bluetooth-Interface-Dive-Watch-
Computer/dp/B09TRS84XP/ref=asc_df_B09TRS84XP/?tag=hyprod-
20&linkCode=df0&hvadid=693032873718&hvpos=&hvnetw=g
&hvrand=6914458821045662324&hvpone=&hvptwo=&hvqmt=
&hvdev=c&hvdvcmdl=&hvlocint=&hvlocphy=9021889&hvtargid=
pla-1737255556527&psc=1&mcid=
1e3234ccfafe3d35a922c620c2bef03a&gad_source=1&gclid=CjwKC
Ajw88yxBhBWEiwA7cm6pf1kieNFeMY5KTyKTYbutY0w4FHZ
oh1vezmgDfzIUDWOUQEmgH9LGBoCIQ4QAvD_BwE; known
prior to Feb. 23, 2024.

*Primary Examiner* — Frederick L Lagman
(74) *Attorney, Agent, or Firm* — Reinhart Boerner Van
Deuren P.C.

(57)       ABSTRACT

A small watertight electronic module is provided that wire-
lessly connects to a smart device, e.g., a wearable device
such as a smartwatch, a Smartphone, etc., and that wirelessly
connects to underwater diving equipment and/or accesso-
ries, e.g. a SCUBA tank pressure transmitter, skin tempera-
ture sensor, heart rate monitor, pressure sensor, navigation
buoy, etc. The module is positioned in close proximity to the
smart device and utilizes a terrestrial communications pro-
tocol, e.g., Bluetooth, WLAN, Ant+, etc. for connection
thereto. In an embodiment, the module also utilizes an
underwater communications protocol, e.g. VLF, ultrasonic, (Continued)

etc., for connection to the underwater diving equipment and/or accessories. A display is provided in certain embodiments to display information, e.g. SCUBA tank air pressure, to the user.

20 Claims, 4 Drawing Sheets

(58) Field of Classification Search
USPC .......................................................... 405/186
See application file for complete search history.

(56) References Cited

U.S. PATENT DOCUMENTS

| | | | | |
|---|---|---|---|---|
| 5,189,646 | A * | 2/1993 | Sako | G01C 5/06 |
| | | | | 73/290 R |
| 5,331,602 | A * | 7/1994 | McLaren | H04B 11/00 |
| | | | | 367/134 |
| 7,144,198 | B2 * | 12/2006 | Hirose | G04G 21/02 |
| | | | | 405/186 |
| 8,122,763 | B2 * | 2/2012 | Fundak | A62B 9/006 |
| | | | | 128/204.22 |
| 8,275,311 | B2 | 9/2012 | Lindman | |
| 8,378,793 | B1 * | 2/2013 | Bryant | B63C 11/18 |
| | | | | 340/384.73 |
| 8,576,665 | B2 * | 11/2013 | Jiang | G01D 21/00 |
| | | | | 367/131 |
| 8,787,006 | B2 | 7/2014 | Golko et al. | |
| 9,065,561 | B2 * | 6/2015 | Imran | H04R 1/46 |
| 9,225,435 | B2 | 12/2015 | Rahkonen et al. | |
| 9,269,254 | B2 * | 2/2016 | Baumgartinger | B63C 11/26 |
| 10,019,885 | B2 * | 7/2018 | Miyake | G08B 21/088 |
| 10,358,199 | B1 | 7/2019 | Kleinigger | |
| 2011/0188349 | A1 | 8/2011 | Basilico | |
| 2013/0171927 | A1 * | 7/2013 | Bryant | H04B 13/02 |
| | | | | 455/40 |
| 2018/0327063 | A1 * | 11/2018 | Ikenoya | G16H 15/00 |
| 2021/0403132 | A1 | 12/2021 | Pourmasiha | |

FOREIGN PATENT DOCUMENTS

| | | | | | |
|---|---|---|---|---|---|
| GB | 2579400 | A | | 6/2020 | |
| KR | 20160146390 | A | | 12/2016 | |
| KR | 10-2017-0091849 | A | | 8/2017 | |
| KR | 10-2021-0027733 | A | | 3/2021 | |
| KR | 20210027733 | A | * | 3/2021 | G01S 19/01 |
| KR | 20220101848 | A | * | 7/2022 | H04B 10/502 |
| WO | WO 2009/032375 | A1 | | 3/2009 | |
| WO | WO 2019/071878 | A1 | | 4/2019 | |

* cited by examiner

WIRELESS SUBMERSIBLE GAUGE HAVING UNDERWATER COMMUNICATION INTERFACE FOR SMART DEVICES

CROSS-REFERENCE TO RELATED PATENT APPLICATIONS

This patent application claims the benefit of U.S. Provisional Patent Application No. 63/449,653, filed Mar. 3, 2023, the entire teachings and disclosure of which are incorporated herein by reference thereto.

FIELD OF THE INVENTION

This invention generally relates to wireless submersible sensors and displays, and more particularly to underwater communication of SCUBA specific information, e.g., tank pressure, heart rate, skin temperature, battery status, depth, navigation information, etc.

BACKGROUND OF THE INVENTION

Smartphones, tablets, smartwatches, and other commercial electronic devices and wearables are designed to operate on land in the air. As such, in order to allow communication of information therebetween and to other devices, they use commercial standard communication methods and protocols. This methods and protocols include, but are not limited to, Bluetooth, Wi-Fi, wireless local area network (WLAN), Global System for Mobiles (GSM), near field communication (NFC), Advanced and Adaptive Network Technology (ANT+), etc.

These various methods and protocols typically use high frequency to increase the bandwidth to enable an increase in the information carried. They also typically use low power to limit battery usage recognizing the mobile nature of such devices and to limit the range of communication to reduce interference and increase security of the information transmitted. For example, GSM (depending on 1G . . . 5G) uses 700/800 MHz, 1.8 GHZ, 2.6 GHz, 3.6 GHz up to a planned 40 GHz, WLAN uses 2.4 GHz and 5 GHz, Bluetooth and ANT+ use 2.4 GHz, and NFC uses 13.56 MHz.

Unfortunately, such high frequencies penetrate only tens of centimeters in fresh water and only a few centimeters salt water when reflection and conductivity are considered. In view of such distance limitations, devices that must communicate underwater use designated underwater communications technologies, e.g., Very Low Frequency (VLF) (typically 3-30 kHz) and/or Ultrasonic (typically 25-33 kHz).

VLF works both in water and in air due its magnetic and electric (H & E) components but due the reduced antenna size and transmitter power, the range is limited in consumer electronics up to the 3 m range. Disturbing signals also attenuate in power of 3 and therefore the link is mainly interrupted by nearby electronical devices radiation only.

Ultrasonic communication works very limited in air (up to 10s of centimeters) but has a very good range in the water (up to 100s of meters).

Due to the limited bandwidth available with the lower frequencies (and distance in air with ultrasonics), devices that are not dedicated or primarily used in water typically do not include such communication circuitry, opting instead for the in-air communication methods and protocols discussed above.

However, the ubiquitous adoption of smart devices and the improvement of waterproof housings utilized as part of or available for use with such smart devices have opened opportunities for the development of underwater apps or use of in-air apps underwater. As an example, the Apple Watch Ultra now includes a housing that is water resistant to 100 m, is EN13319 certified, and a depth gauge that provides real-time measurement of underwater depth down to 40 m, along with water temperature readings, time under water, etc., and can be activated automatically when the user goes underwater. Further, smartphone underwater cases are available that enable a user to take underwater pictures with the smartphone camera.

Unfortunately, the richness of the user experience with such smart devices is still limited underwater because communication between various underwater diving accessories and equipment and these smart devices is not possible due to the different methods and protocols used by these different classes of devices for the reasons discussed above. While the smart devices could be designed with both in-air and underwater communications hardware and protocols, the cost and increased size required is prohibitive. This is particularly true considering the relatively low numbers of people who engage in both activities.

Even if the makers of such smart devices were inclined to include such additional underwater communications hardware despite its additional size and cost to increase the capabilities of such smart devices, the additional regulatory environment and associated cost associated therewith for devices used as dive equipment would likely tip the scale back the other way.

Indeed, if SCUBA tank pressure data is received by the smartwatch in order to increase the dive computer operability, then the smartwatch itself will become a part of European Union EN250 directive. This directive would then require that the smartwatch be tested and yearly surveilled by an external certified CE Notifying Body. While such requirements and associated costs are justified for dedicated dive computers purchased specifically by the diving community, it is a cost not likely to be accepted by the purchasers of smart watches that may only very occasionally be used for such activities.

In view of the above, there is a need in the art for a system and method to increase the richness of the user experience of smart devices when used underwater, for both new and existing smart devices and underwater accessories. Embodiments of the present invention provide such systems and methods. These and other advantages of the invention, as well as additional inventive features, will be apparent from the description of the invention provided herein.

BRIEF SUMMARY OF THE INVENTION

In one aspect, embodiments of the present invention provide new and improved systems and methods that extend or enhance the usage of smart devices to/in the underwater environment. More particularly, embodiments of the present invention provide a new and improved communication interface between underwater equipment and accessories and smart devices. Still more particularly, embodiments of the present invention provide a new and improved communication interface between underwater equipment and accessories that also serves as a primary display of information requiring certification and surveillance by external certified CE Notifying Body.

In an embodiment, a small watertight electronic module is provided that wirelessly connects to a smart device, e.g., a wearable device such as a smartwatch, a Smartphone, etc., and that wirelessly connects to underwater diving equipment and/or accessories, e.g. a SCUBA tank pressure transmitter, skin temperature sensor, heart rate monitor, devices for positioning and navigation (e.g., global navigation satellite system (GNSS), navigation buoys), depth information, etc. In an embodiment, the module is positioned in close proximity to the smart device and utilizes a terrestrial communications protocol, e.g., Bluetooth, WLAN, Ant+, etc. for connection thereto. In an embodiment, the module also utilizes an underwater communications protocol, e.g. VLF, ultrasonic, etc., for connection to the underwater diving equipment and/or accessories.

In an embodiment, the module is attached on a smartwatch wrist strap. Preferably, that attachment is via a universal or smartwatch specific connection so as to maintain the module in very close proximity to the smartwatch body. In an alternate embodiment, the module is integrated into a wrist strap that may replace or supplement the standard smartphone strap. In yet a further alternate embodiment, the module is clipped or otherwise mechanically positioned on the wrist strap in such a manner that it cannot move out of range of the very short range under water that the terrestrial communication protocol can work.

In an embodiment, the module is attached on a smartphone, camera, non-waterproof smartwatch, etc. case, or integrated as part thereof. Preferably, that attachment is via a universal or case specific connection so as to maintain the module in very close proximity to the smartphone, camera, non-waterproof smartwatch body. In an alternate embodiment, the module is clipped or otherwise mechanically positioned on the case in such a manner that it cannot move out of range of the very short range under water that the terrestrial communication protocol can work.

In one embodiment, the module includes a printed circuit board assembly (PCBA) that includes a microcontroller and memory, a battery, a pressure sensor, a terrestrial communications module to communicate with the smart device, an antenna for the terrestrial communications module, an underwater communications module to communication with the diving equipment and/or accessories, and an antenna for the underwater communications module. A user interface and/or an activation sensor, which may include a/the pressure sensor, is/are also included. In a further embodiment, the module includes a display to provide the communicated underwater information to the user.

In one embodiment, the microcontroller buffers the underwater data in the memory and sends it to the smart device after the immersion is completed. The module in an embodiment shows the tank pressure data instantly on its display and provides this stored information to the smart device after the dive to add it on the complete logbook of the smart device. In another embodiment, the user is able to select desired information provided from the diving equipment and/or accessories. In one embodiment, the data transfer of this stored or buffered data is accomplished using the terrestrial communications protocol.

In one embodiment an underwater app is provided to be installed on the smart device. In an embodiment, the app is used to visualize the data and metrics provided by the underwater diving equipment and/or accessories via the module on the smart device's display. In certain embodiments, the app provides different operating modes, such as swimming, apnea, snorkeling, diving, etc., to provide the metrics according to the user's activity.

In an embodiment the module provides underwater information to an underwater app that is native to or provided by a third party to be installed on the smart device. In an embodiment, the native or third-party app is used to visualize the data and metrics provided by the underwater diving equipment and/or accessories via the module on the smart device's display.

In an embodiment usable with a non-waterproof smart watch, smart phone, or other smart device to be worn on the arm of the user, the system includes a waterproof housing for the smart device, paired with an arm strap that includes a second housing on the strap equipped with a pressure sensor, a terrestrial communication, e.g., Bluetooth, antenna, an underwater communication, e.g. to receive information from a SCUBA tank's transmitter, antenna, a rechargeable battery, and processing electronics.

In one embodiment the battery is charged through wet contacts, while in another embodiment recharging is provided by inductive charging. The wet contacts are used in an embodiment to activate the module for the underwater operation. In an embodiment the wet contacts provide a simple user interface to enable the Bluetooth communication for pairing, etc. Such an embodiment provides an energy savings that prevents battery depletion that would otherwise occur if the module would be constantly receiving Bluetooth requests or sending advertising messages. In an embodiment, the wet contacts may also provide a user interface that starts and stops memory-based recording of the module. The housing also includes in certain embodiments other user interfaces, e.g., a push button, a rotate and push crown, etc.

In an embodiment wherein the module includes a display, the module can receive and display the SCUBA tank pressure data and/or data from other immersed or surface sensors as a standalone system. In such an embodiment the EN250 requirement is fulfilled without a need to test the smart device, e.g., smartwatch, smart wearable, smartphone, etc., as a part of the system. However, the module can still relay the information to the smart device, for example via Bluetooth, during the immersion as a secondary display of tank pressure, remaining bottom time, pressure warnings, etc., or after the immersion for logbook integration or other functions provided by the smart device.

In an embodiment, the module utilizes an open and/or a proprietary communication protocol as specified by a particular manufacturer of underwater sensors to allow usage therewith. Such protocols may utilize, e.g., VLF, ultrasonic, or other underwater communications systems. Such module also utilizes an open and/or proprietary terrestrial communications protocol, e.g., Bluetooth, to share information from the underwater sensors, e.g., the tank pressure data, heart rate, skin temperature, battery status, depth, navigation, etc. Usage of such a common format allows this data to be defined public information or open source for smart device, e.g., smartwatch, wearable, smartphone, camera, underwater case or housings, etc., developers.

In an embodiment for use with Human Factor (heart rate, skin temperature, etc.) sensors that may share the same underwater communications link as the tank pressure sensors, this data is also relayed or shared with the smart device as well. In an embodiment having a simple display and user interface, such and other data and values are not shown thereon, but instead simply relayed to the smart device in a simple repeater mode. In such an embodiment the module display would be dedicated for the tank pressure to fulfill the EN250 requirements. In other embodiments, such additional information and data may be displayed on the module as well.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there are illustrated embodiments of the present invention configured to operate with various smart devices, e.g., smartwatches and smartphones, and various underwater sensors commonly used during swimming, snorkeling, SCUBA diving, free diving, etc. However, it should be noted that while various embodiments and operating environments and activities are described, such are provided in order to aid in the understanding of the present invention. Therefore, the following description should be taken by way of example and not by way of limitation. Indeed, various other embodiments will become apparent to those of ordinary skill in the art from the following description, and the full scope of same is reserved.

Figures 1, 2:
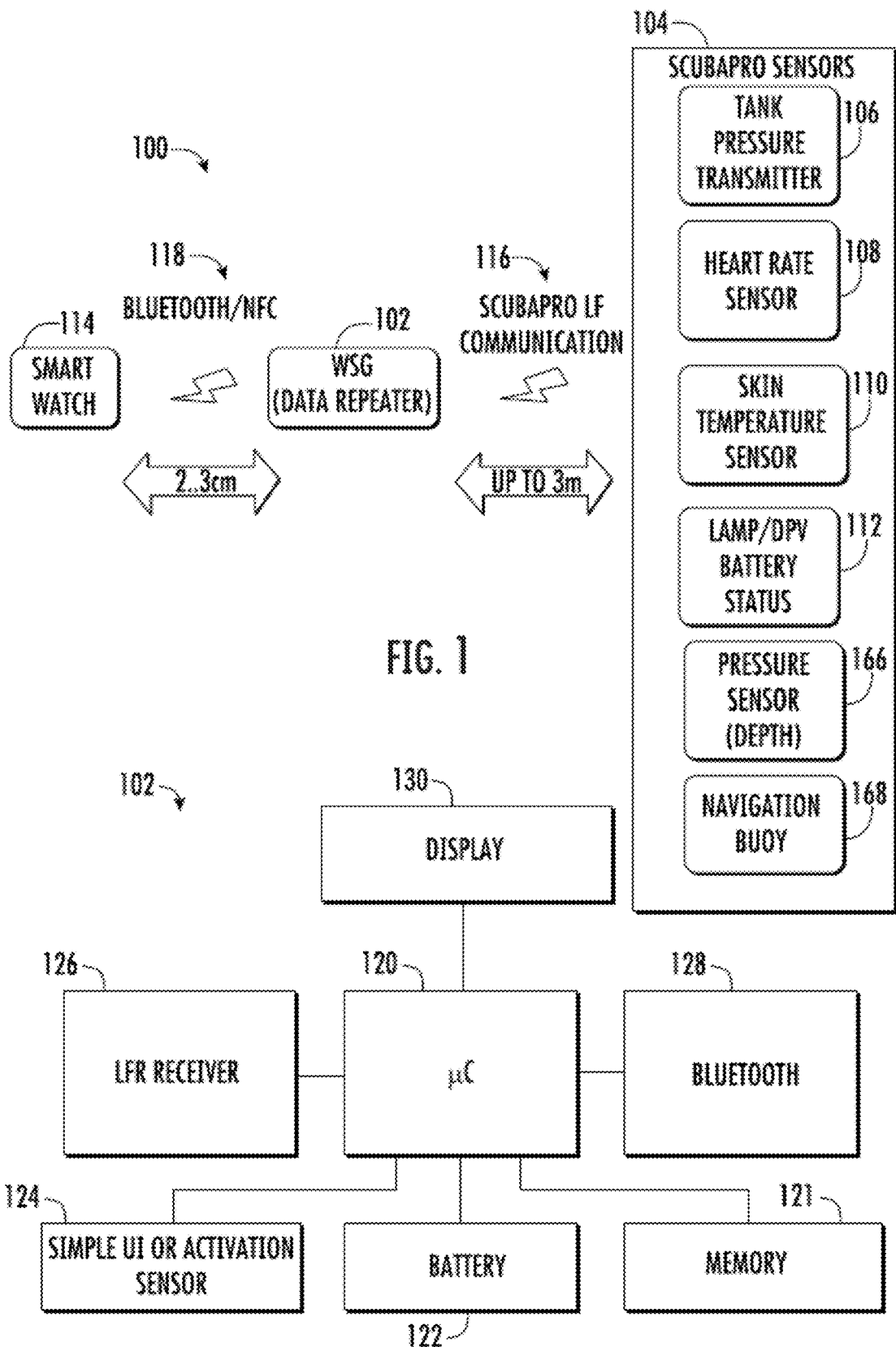
FIG. 1 is a simplified system level communications block diagram of an embodiment of the present invention.
FIG. 2 is a block diagram of an embodiment of a wireless submersible gauge constructed in accordance with the teachings of the present invention.

FIG. 1 illustrates a simplified communications block diagram of the water submersible gauge (WSG) communications system 100 of an embodiment to the present invention. As illustrated, this WSG communication system 100 utilizes a water submersible gauge (WSG) module 102 as the communications interface between the underwater sensors and accessories 104, such as a tank pressure transmitter 106, a heart rate sensor 108, a skin temperature sensor 110, a lamp/DPV battery status sensor 112, pressure sensor 166 for determining depth, terrestrial positioning buoys 168 providing GPS or other position information via ultrasonic or other long range communications protocols, etc. Such terrestrial positioning buoys 168 that provide GPS or other position information via ultrasonic or other long-range communications protocols may be as described in co-pending U.S. application Ser. No. 17/825,161, entitled Dive Computer Integrated Navigation System, filed May 26, 2022, (hereinafter the '161 Application) and assigned to the assignee of present application, the teachings and disclosure of which are hereby incorporated in their entireties by reference thereto. The WSG communication system 100 also includes a smart device 114, such as a smartwatch, smartphone, or other smart device.

As illustrated in FIG. 1, the communication link between the underwater sensors and accessories 104 and the WSG 102 may utilize a low frequency underwater communications link 116 or other underwater communications technology, e.g., ultrasonic with a longer range as discussed above and in the '161 Application, or a combination of each of these communications technologies depending on which sensors are used.

As known in the art, such an underwater low frequency communications link 116 typically has a range of up to approximately three meters depending on the frequency, etc. This distance is acceptable since the underwater sensors and accessories 104 are typically located on or closely associated with the swimmer or diver, as is the traditional dive computer that typically would be worn or carried by the swimmer or diver and would display the information directly communicated thereto for the diver's benefit. Also as is known in the art, such underwear ultrasonic communications link typically has a range of hundreds of meters. This distance is particularly good for information that is provided by remotely located devices, e.g., navigation buoys such as described in the '161 Application used in an embodiment of the present invention.

However, as discussed above, current smart devices 114 do not typically include any communications interface that would allow reception of information from the underwater communication link 116 (low frequency or ultrasonic). Instead, such smart devices 114 typically only include terrestrial based communications interfaces that, as discussed above, only have a very short range of a couple of centimeters underwater.

In order to relay the information from the underwater sensors and accessories 104 to the smart device 114, the WSG 102 utilizes a terrestrial communications link 118 in order to provide the information to the smart device 114. As discussed above, various terrestrial communications links 118 may be utilized in the system 100 of the present invention despite the extremely limited range of only two to three centimeters of transmit range under water because the WSG 102 may be located within such distance of the smart device 114.

In other words, embodiments of the present invention are enabled by meeting the different transmission distance limitations underwater, to wit, physically positioned within approximately three meters of the underwater sensors using low frequency communications, the hundreds of meters of the underwater sensors using ultrasonic communications, of such sensors and accessories 104, and within two to three centimeters of the smart device 114. In this way, the WSG 102 can receive information transmitted by the underwater sensors and accessories 104 utilizing the underwater low frequency and/or ultrasonic communication link 116 for which such devices were designed and relay such information utilizing the terrestrial communication link 118 for which the smart device 114 was designed. Indeed, particular embodiments of such a system will be discussed more fully below with regard to FIGS. 3-7.

Before discussing any particular embodiment of the system 100 of the present invention, however, attention is directed to FIG. 2, which illustrates a simplified block diagram of the WSG module 102. As may be seen, the WSG module 102 utilizes a microcomputer 120 that may be powered by a battery 122. As is appreciated by those skilled in the art from the present description, such battery 122 may be a dedicated replaceable battery, or may be rechargeable in various embodiments. Such recharging may be accomplished via wet contacts, inductive charging, etc. In order to preserve battery life, the WSG 102 may utilize a simple user interface or an activation sensor 124 that may turn on the WSG 102 at the start of a dive and turn off the WSG 102 once the dive has been completed and the user is no longer in the water and submerged. In one embodiment the activation sensor 124 includes a pressure sensor capable of measuring the depth underwater for communication of that depth information to the smart device 114 (see FIG. 1), or to the display 130 discussed more fully below.

The WSG module 102 also includes an underwater, low frequency and/or ultrasonic, receiver 126 that is/are configured to receive the information from the underwater sensors and accessories 104 shown in FIG. 1. Such receiver 126 may be configured to utilize a particular underwater communication protocol for a particular manufacturer or may include multiple or multi-band receivers that are/is capable of receiving underwater transmissions from the sensors and accessories from various manufacturers. Receiver effectiveness may also be enhanced in an embodiment by providing multiple orthogonal antennas for the receiver or receivers. This receiver 126 may also have transmit capabilities in order to allow any required paring or handshaking with the underwater sensors and accessories 104.

The WSG 102 also includes a terrestrial communication link receiver 128, so as to communicate with the smart device using the terrestrial communications protocol compatible therewith. As with the receiver 126, the terrestrial communication transmitter 128 may be configured to communicate using a particular terrestrial communications protocol or may include multiple or a multi-band transmitter to allow compatibility with various manufacturers of smart devices that may utilize different terrestrial communications protocols for communication therewith. Indeed, as with the receiver 126, the terrestrial communication transmitter 128 may also include a receiver in order to participate in any handshake or other pairing requirements of the devices to which it will communicate.

As illustrated in the embodiment of FIG. 2, the WSG module 102 also includes memory 121. The memory 121 may be used to store or buffer the underwater data for later transmission to the smart device after the immersion is completed. Such is particularly useful when adding such underwater information to the smart device after the dive to complete the logbook on the smart device.

Also as illustrated in the embodiment of FIG. 2, the WSG module 102 also includes memory 121 and a display 130. This display 130 is optional for the WSG module 102, particularly in systems that do not utilize a tank pressure transmitter 106 (see FIG. 1), or in systems where the smart device complies with the regulatory requirements for monitoring and certification, e.g., EN250. However, in embodiments to be used with smart devices that do not comply with such regulatory requirements, the display 130 may be utilized as the primary tank pressure display for the overall system with a WSG module 102 and does comply with such regulatory requirements as part of the system.

Figures 3, 4:
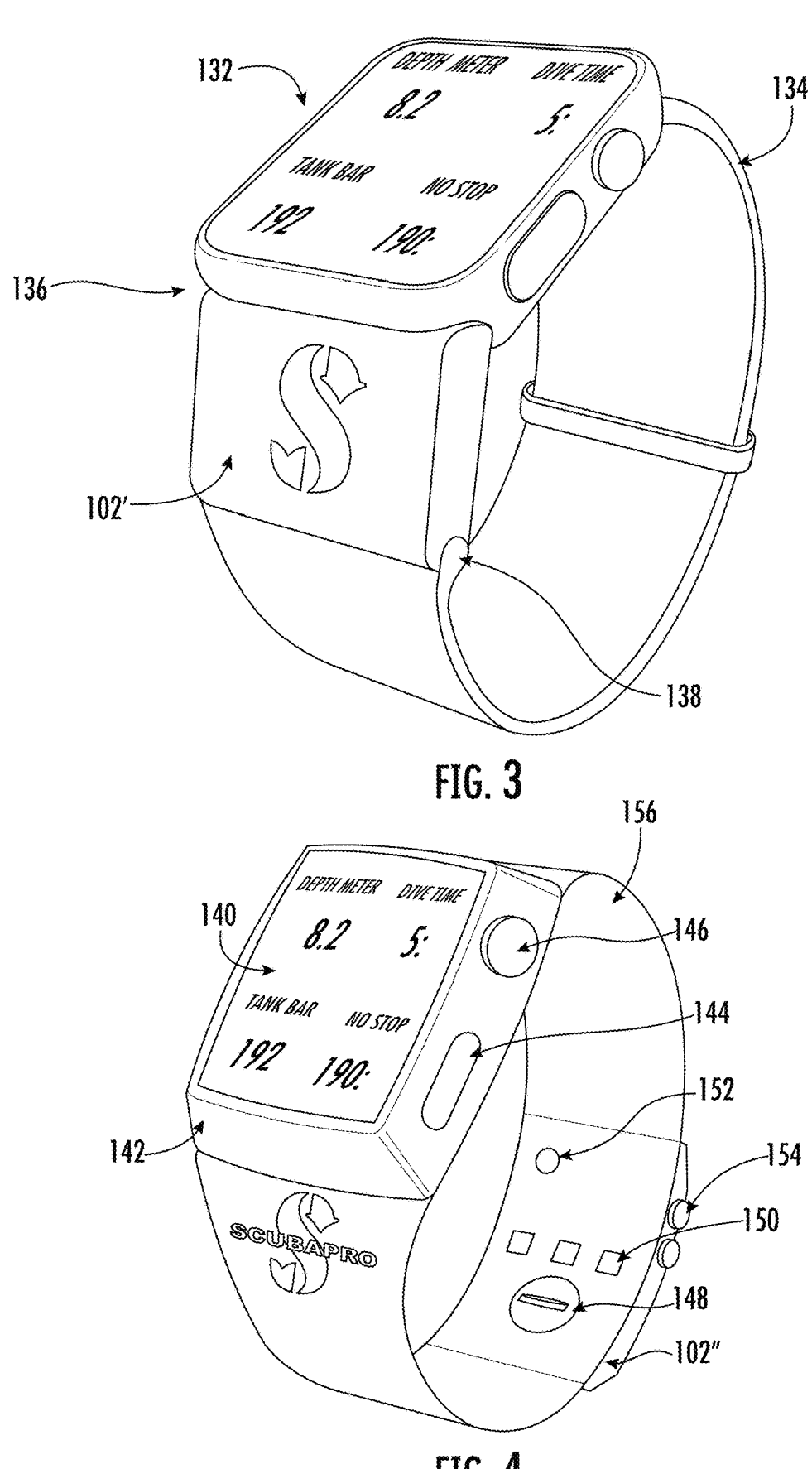
FIG. 3 is an isometric view of an embodiment of the present invention configured to attach to a submersible smartwatch.
FIG. 4 is a is an isometric view of an alternate embodiment of the present invention configured to house a non-waterproof smartwatch.

With an understanding now of the overall WSG system 100 and the configuration of the WSG module 102 itself, attention is directed to FIG. 3, which illustrates one embodiment of a physical implementation of the system 100 of the present invention. Depicted therein is a water submersible smartwatch 132 and its wristband 134. In this embodiment, the WSG module 102' includes a smartwatch connection interface 136 and a wristband connection interface 138.

In such an embodiment, the WSG module 102' may utilize the smartwatch connection interface 136 to connect to the smartwatch 132 as if it were the end of the wristband 134 configured to mate therewith. In other words, the connection to the smartwatch 132 mimics the connection that the wristband would occupy if it were directly connected to the smartwatch 132 body. On the opposite end of the WSG module 102' the wristband connection interface 138 appears to the wristband 134 as the connection interface provided on the smartwatch 132. In other words, to the wristband 134, the wristband connection interface 138 mimics the connection interface on the body of the smartwatch 132 to which it is typically attached. In this way, the WSG module 102' may simply be inserted between the smartwatch 132 and the end of the band 134 such that no additional or different equipment need be purchased or acquired in order to integrate the WSG module 102' with the smartwatch 132.

While such connection interfaces provide the greatest flexibility in mating with various different smartwatch/wristband combinations, an alternative embodiment may utilize a fixed connection to a wristband section instead of providing a wristband connection interface 138.

In either configuration, and while the embodiment of the WSG module 102' illustrated in FIG. 3 does not specifically illustrate a separate display 130, such may be incorporated on the face of the WSG module 102' to display, at least, the tank pressure information.

While the embodiment of FIG. 3 is particularly suited to a water submersible smartwatch 132, the embodiment illustrated in FIG. 4 is particularly well suited to non-submersible smartwatches 140. When utilized with such a non-submersible smartwatch 140, the WSG module 102" may be included as part of a waterproof housing 142 sized and configured to contain the non-submersible smartwatch 140 therein. Such a waterproof housing 142 would also include the user interface buttons 144 and crown 146, etc. that are provided on the non-submersible smartwatch 140 housing so that the user could continue to operate the non-submersible smartwatch 140 in its normal manner.

In certain embodiments, the WSG module 102" may include a battery access 148, wet recharging contacts 150, and/or an area for inductive charging 152. In certain embodiments, the wet recharging contacts 150 are used to activate the module for the underwater operation. In an embodiment the wet contacts provide a simple user interface to enable the Bluetooth communication for pairing, etc. Such an embodiment provides an energy savings that prevents battery depletion that would otherwise occur if the module would be constantly receiving Bluetooth requests or sending advertising messages. In an embodiment, the wet contacts may also provide a user interface that starts and stops memory-based recording of the module.

As illustrated in this FIG. 4, an activation pressure sensor 154 is also illustrated and may be used in an embodiment to activate the module for underwater operation. The antennas for each of the underwater and terrestrial communication links may also be embodied in the WSG module 102" housing and/or the watchband 156 provided in this embodiment.

Figures 5, 6:
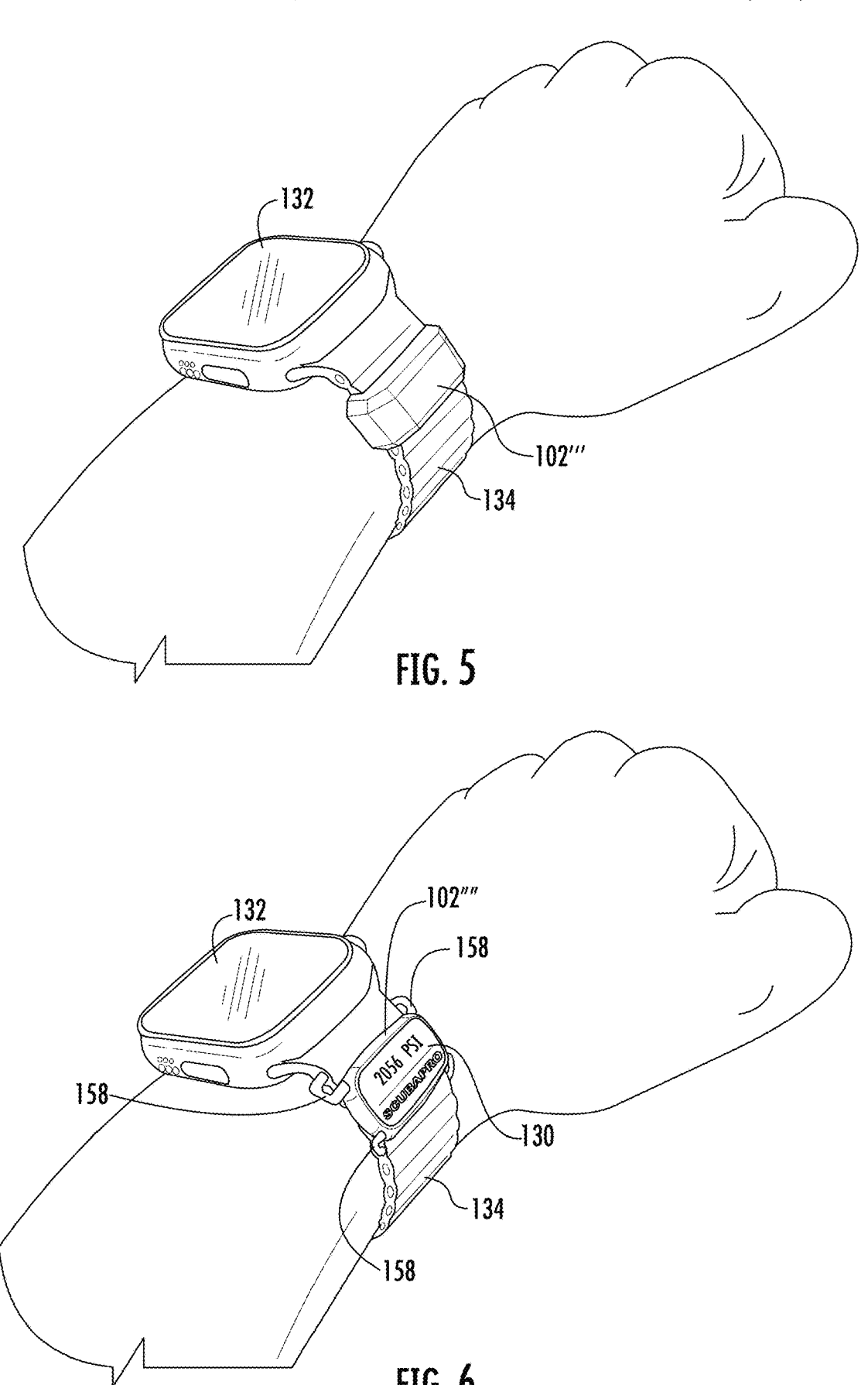
FIG. 5 is an isometric view of an embodiment of the present invention configured to attach to a wristband of a submersible smartwatch.
FIG. 6 is an isometric view of an alternate embodiment of the present invention configured to attach to a wristband of a submersible smartwatch.

With reference now to FIG. 5, there is illustrated yet another embodiment of the WSG module 102''' having a simplified housing through which the watchband 134 of the water submersible smartwatch 132 may be positioned. As illustrated, the WSG module 102''' is preferably positioned within close proximity of the body of the water submersible smartwatch 132, although if the WSG module 102''' were to slide to a different position on the watchband 134, the underwater communication distance would still be within the normal range for communication underwater.

If, however, the WSG module 102'''' such as show in FIG. 6 were to include a display 130 for the tank pressure information, accurate positioning for easy viewing by the diver becomes more important. In such embodiments, the WSG module 102'''' may include clips 158 that may securely position the WSG module 102'''' at a known position on the wristband 134 of the water submersible smartwatch 132. While the embodiment of FIG. 6 illustrates clips 158 that are particularly well suited to interface with the ocean band of the Apple Watch Ultra, the configuration and operation of alternative clips may be provided to interface with other wristbands in other embodiments.

Figure 7:
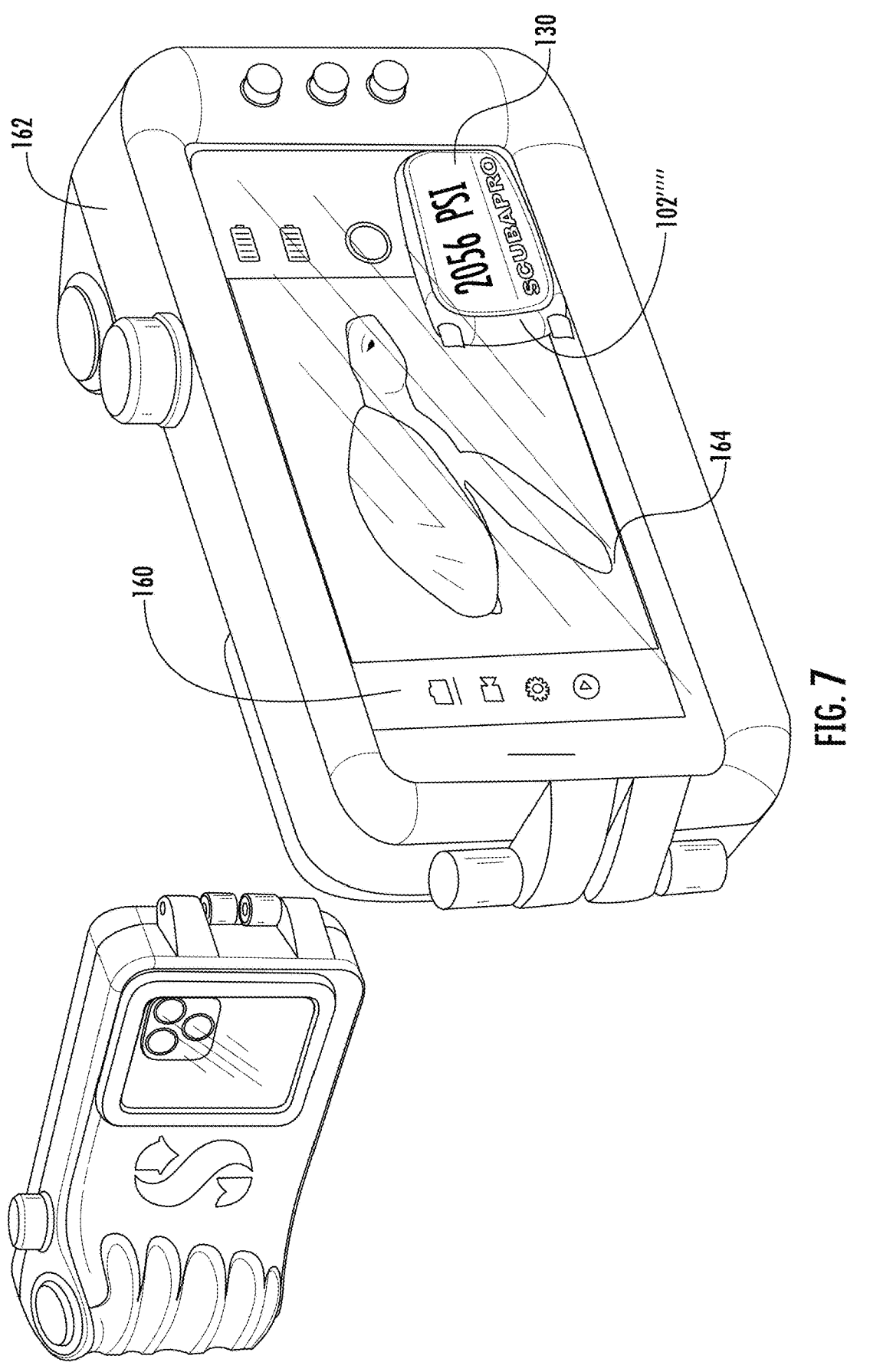
FIG. 7 is an isometric view of an embodiment of the present invention configured to integrate with a waterproof smartphone case configured to allow use of the smartphone as an underwater camera.

While FIGS. 3-6 illustrate various embodiments of the WSG system 100 of the present invention as interfacing with smartwatches, the embodiment of FIG. 7 illustrates an alternative embodiment wherein the WSG module 102'''''' is provided to interface with a smartphone 160. In the illustrated embodiment, the WSG module 102 is incorporated with a waterproof smartphone case 162 that is particularly configured to allow operation of the smartphone 160 as an underwater camera. In such configuration, the display 130 of the WSG module 102'''''' is positioned on the back side viewing window 164 of the case 162 that is most likely observed by the user while taking pictures underwater.

The WSG module 102'''''' can be located inside or outside of the window 164. In certain embodiments, the WSG module 102'''''' is powered by the waterproof smartphone case 162 battery, the smartphone 160 battery, or its own internal battery, and may share user interface functionality with the buttons provided by the waterproof smartphone case 162. While the case 162 is illustrated as providing the underwater camera functionality as discussed above, such functionality is not required in all embodiments, and instead the case 162 may simply be a waterproof smartphone case with the WSG module 102'''''' functionality integrated therein.

In any of the embodiments discussed above, or in embodiments wherein the WSG module 102 interfaces with other types of smart devices, a diving app may be provided for the smart device for displaying the relayed information as well as utilizing same for calculation of various diving parameters that may be of use to a diver while underwater. Further, the information provided from the underwater sensors and accessories 104 via the WSG module 102 may be integrated in apps or operating modes already resident on the smart device or provided by third party developers to provide additional and more enhanced information and/or calculations for use underwater.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wireless submersible gauge, comprising:
   an underwater communication interface for receiving information from a diving sensor;
   a terrestrial communication interface for transmitting the information received by the underwater communications interface from the diving sensor to a smart device;
   a display for displaying the information received by the underwater communications interface from the diving sensor to a user; and
   an attachment configured to position the wireless submersible gauge in close proximity to the smart device to enable the terrestrial communication interface to transmit the information to the smart device during a dive.

2. The wireless submersible gauge of claim 1, further comprising a memory configured to store the information received from the diving sensor during a dive, and upon completion of the dive to provide the information stored therein to the terrestrial communication interface for transmitting the information to the smart device.

3. The wireless submersible gauge of claim 1, wherein the diving sensor is one of a SCUBA tank pressure transmitter, a skin temperature sensor, a heart rate monitor, a navigation buoy, or a depth sensor.

4. The wireless submersible gauge of claim 1, wherein the terrestrial communication interface uses a terrestrial communications protocol for transmitting the information received by the underwater communications interface from the diving sensor to the smart device.

5. The wireless submersible gauge of claim 4, wherein the terrestrial communication protocol is at least one of Bluetooth, WLAN, or Ant+.

6. The wireless submersible gauge of claim 1, wherein the underwater communication interface uses an underwater communications protocol for receiving information from the diving sensor.

7. The wireless submersible gauge of claim 6, wherein the underwater communications protocol is at least one of very low frequency (VLF) or ultrasonic.

8. The wireless submersible gauge of claim 1, wherein the underwater communication interface for receiving information from the diving sensor is further configured for transmitting pairing information to the diving sensor.

9. The wireless submersible gauge of claim 1, wherein the terrestrial communication interface for transmitting the information to the smart device is further configured for receiving pairing information from the smart device.

10. The wireless submersible gauge of claim 1, wherein the attachment is configured to attach on a wrist strap of the smart device.

11. The wireless submersible gauge of claim 1, wherein the attachment is configured to be interposed between the smart device and a wrist strap.

12. The wireless submersible gauge of claim 1, further comprising at least one of a user interface or an activation sensor.

13. The wireless submersible gauge of claim 1, further comprising a printed circuit board assembly (PCBA) that includes a microcontroller and memory, a battery, a pressure sensor, the terrestrial communication interface, a first antenna for the terrestrial communication interface, the underwater communication interface, and a second antenna for the underwater communication interface.

14. The wireless submersible gauge of claim 13, wherein the microcontroller is configured to buffer the information in the memory during a dive and to transmit the information to the smart device after the dive is completed.

15. The wireless submersible gauge of claim 13, wherein the microcontroller is configured to display the information on the display during a dive and to send the information to the smart device after the dive to enable the smart device to add the information to a logbook of the smart device.

16. The wireless submersible gauge of claim 13, further comprising wet contacts configured to enable charging of the battery.

17. The wireless submersible gauge of claim 16, wherein the wet contacts are further configured to indicate submersion for a dive to activate the wireless submersible gauge for operation.

18. A wireless submersible gauge, comprising:

an underwater communication interface for receiving information from a diving sensor;

a terrestrial communication interface for transmitting the information received by the underwater communications interface from the diving sensor to a smart device;

a display for displaying the information received by the underwater communications interface from the diving sensor to a user; and a wrist strap configured to attach to the smart device, and wherein the underwater communication interface, the terrestrial communication interface, and the display are integrated into the wrist strap.

19. A wireless submersible gauge, comprising:

an underwater communication interface for receiving information from a diving sensor;

a terrestrial communication interface for transmitting the information received by the underwater communications interface from the diving sensor to a smart device;

a display for displaying the information received by the underwater communications interface from the diving sensor to a user; and a waterproof case configured to enclose the smart device, and wherein the underwater communication interface, the terrestrial communication interface, and the display are integrated as part thereof.

20. A wireless submersible gauge, comprising:

an underwater communication interface for receiving information from a diving sensor;

a terrestrial communication interface for transmitting the information received by the underwater communications interface from the diving sensor to a smart device;

a display for displaying the information received by the underwater communications interface from the diving sensor to a user; and an underwater app installed on the smart device configured to visualize the information on a smart device display.

* * * * *